(12) United States Patent
Luk

(10) Patent No.: US 11,925,290 B2
(45) Date of Patent: Mar. 12, 2024

(54) COOKING LID WITH VARIABLE SETTING VENT AND SCREEN

(71) Applicant: Tobias Wai Luk, Springfield, MO (US)

(72) Inventor: Tobias Wai Luk, Springfield, MO (US)

( * ) Notice: Subject to any disclaimer, the term of this patent is extended or adjusted under 35 U.S.C. 154(b) by 248 days.

(21) Appl. No.: 17/464,614

(22) Filed: Sep. 19, 2021

(65) Prior Publication Data

US 2023/0087538 A1    Mar. 23, 2023

(51) Int. Cl.
*A47J 36/06* (2006.01)
*A47J 37/10* (2006.01)

(52) U.S. Cl.
CPC ............. *A47J 36/06* (2013.01); *A47J 37/101* (2013.01)

(58) Field of Classification Search
None
See application file for complete search history.

(56) References Cited

U.S. PATENT DOCUMENTS

| 3,937,359 | A | | 2/1976 | Stockton | |
| 4,000,830 | A | | 1/1977 | French | |
| 6,056,146 | A | * | 5/2000 | Varakian | A47J 37/108 220/573.1 |
| 10,653,269 | B1 | * | 5/2020 | Jamison | A23L 5/10 |

* cited by examiner

*Primary Examiner* — Don M Anderson
(74) *Attorney, Agent, or Firm* — Donald Debelak

(57) ABSTRACT

A domed cooking lid with a handle, with a variable venting device in the middle of the dome. The venting device has a screen that is secured to the bottom of the domed lid, a ring on the top of the lid which sits on the lid just outside the hole that facilitates the variable venting device, a stationary disc with numerous holes on one side and a turntable disc which has a large opening of the disc, whereby turning the turntable disc over more or fewer holes, changes the variable venting rate of the domed lid.

2 Claims, 4 Drawing Sheets

COOKING LID WITH VARIABLE SETTING VENT AND SCREEN

FIELD OF THE INVENTION

Lids for cooking pots and pans, with a special emphasis on cooking lids for use with frying pans.

BACKGROUND

Frying foods in an oil or margarin medium often results in a splattering of grease into the area surrounding the cooking utensil and inherently creates a messy kitchen. To prevent grease splattering, a cover of some type is necessary for the skillet or fry pan and heretofore there have been introduced mesh coverings for such purposes, to catch some of the grease, but also to allow heat to escape. However, such coverings quickly saturate with grease and become quite difficult to clean. Further, double lids have been proposed wherein holes in each of two lid coverings are brought into and out of registration for venting purposes while preventing splattering. Again, such double-lid structures have been found difficult to keep clean and sanitary since grease often embeds itself between the two lids.

BACKGOUND—PRIOR ART

U.S. Pat. No. 4,000,830 also discloses a cooking lid with a venting procedure for cooking lids, primarily to allow heat from one cooking vessel to impact a second vessel, but it does have holes on top that can be closed or opened by sliding a plate back and forth. The patent does mention its use for preventing grease build up. This application differs in significant ways, first it uses a high ceiling doom shape with holes provide a pathway for heat escapement. Second this device uses a turntable disc and a stationary disc versus a sliding plate. Third this device has an opening area, which housed the component that allows the vent to be variably open. The vent can be totally closed with the exception of one hole always left open, partially opened by the turntable disc to open to the maximum level disc of this device has openings on one half, and a solid. This configuration is drastically different than the sliding plate of U.S. Pat. No. 4,000,830. Another key difference in this device, is that the device can be easily removed by turning the handle, which also operates as a handle to lift the lid, while it is unclear in 400083 how the device is removed for cleaning.

OBJECT OF THE INVENTION

Consequently, it is an object of the instant invention to present a cooking utensil and particularly a pan cover which is operative for preventing grease splattering while also releasing heat while being substantially impervious to clogging and which can also be easily cleaned.

A further object of the invention is to have an energy saving device with the use of a domed shape lid and the holes allowing the heat air escapement.

A further object of the invention is improve the taste of frying fish, steak, other meat and produce by controlling the heat escapement wakes makes the meat juicier and crispier.

Yet a further object of the invention is to present a cooking utensil which is simplistic in structure, effective in operation, easily cleaned and relatively inexpensive to construct.

A still further object of the present invention is the provision of a cooking vessel cover having one moving part which may be quickly separated for cleaning and sanitary use without requiring the conventional hinges, springs, rolled lips or small crevices which trap dirt, germs and resist complete cleaning usually attendant with plural cover members.

With the foregoing and other objects in view the invention will be more fully described hereinafter and more particularly pointed out in the appended claims.

SUMMARY OF THE INVENTION

The device is a domed cooking lid with a handle, with a variable venting device in the middle of the dome. The venting device has a screen that is secured to the bottom of the domed lid, a ring on the top of the lid which sits on the lid just outside the hole that facilitates the variable venting device, a stationary disc, with numerous holes on one side of the disc, the other half being solid, the disc is held stationary by a friction surface on top of the ring. On top of the stationary is disc is a turntable disc that sits on top of the stationary disc. This disc on one half has a large opening, while other side is solid. The disc can be turned due the smooth surface of the two discs, to have the opening over the holes for venting, or over the solid part if venting is not desired. Both discs have small hole which can be positioned in alignment, so there is always a small amount of venting even when the turntable is turned over the solid section of the stationary disc. The discs are held in position over the opening with a bolt and nut, the bolt head on top of the turntable disc and the nut attached to the bolt on the underside of the screen.

PART NUMBER DESCRIPTION

1. Domed Lid.
2. Handle
3. Ring on top of domed lid
4. Turntable disc.
5. Opening in turntable disc.
6. Bolt that holds the turntable disc, stationary disc and screen together in use.
7. Opening in the lid for the flow through of heat escaping through the lid.
8. Nut on the bottom for bolt #6
9. Screen
10. Stationary disc
11. Friction surface on top of ring.

12. Holes in the stationary disc.
13. Hole in the stationary disc that aligns with hole in the turntable disc.
14. Hole in the turntable disc that aligns with the hole in the stationary disc.

DETAILED DESCRIPTION

Figure 1:
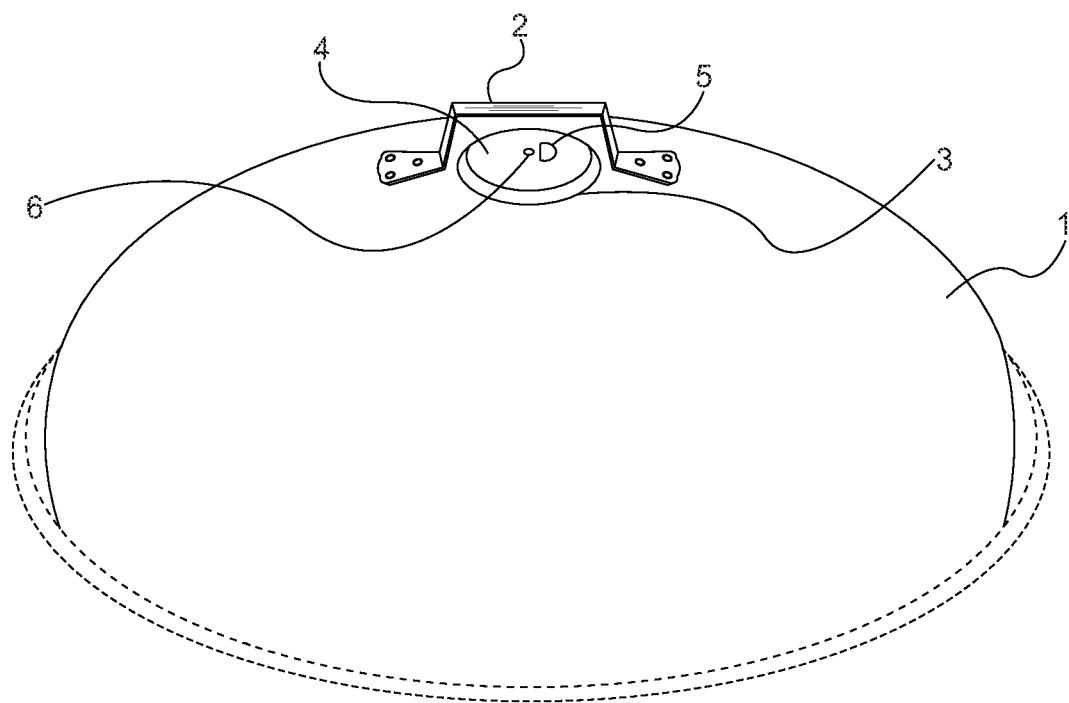
FIG. 1 is an overview of the domed lid and its major components

FIG. 1 shows most of the major components of the domed lid 1. The major venting items shows are the ring 3, with a friction top surface 11 (not shown in this figure) on which has the stationary disc 9, sitting on the ring held in place by the friction surface, on top of the stationary disc 9, is the turntable disc 4 which turns due to a smooth top surface on the stationary disc, and a smooth bottom surface on the turntable disc. The bolt 6, is for a bolt that extends from the top of the turntable disc 4 through the stationary disc 10 (not shown) and then through the screen 9 (not shown).

Figure 2:
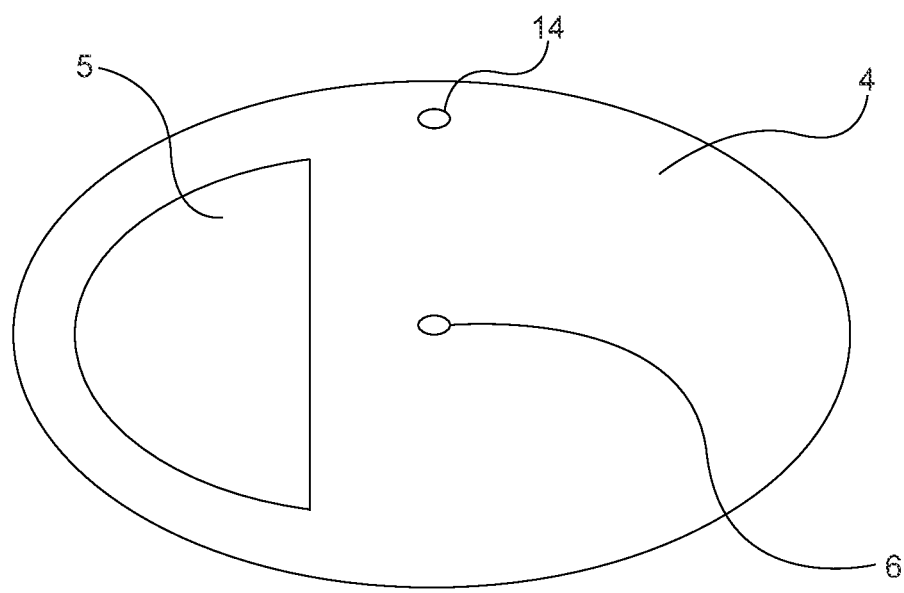
FIG. 2 shows the turntable disc, which turns due to the smooth surface of the disc components in the venting device, with a large section on one side of the disc open.

FIG. 2 shows a more tailed look at the turntable disc 4, with a large opening 5 on one side of the disc and the head of a bolt 6 which holds the venting components together.

Figure 3:
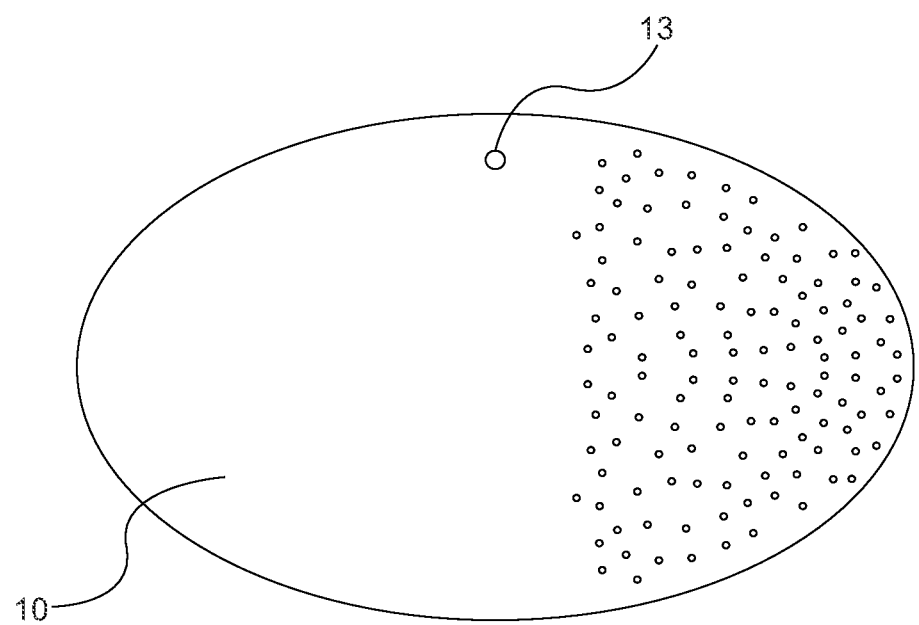
FIG. 3. shows the stationary disc which has holes one side of the flat surface.

FIG. 3 show the stationary disc 10, with a series of holes on one side of the disc 12.

Figure 4:
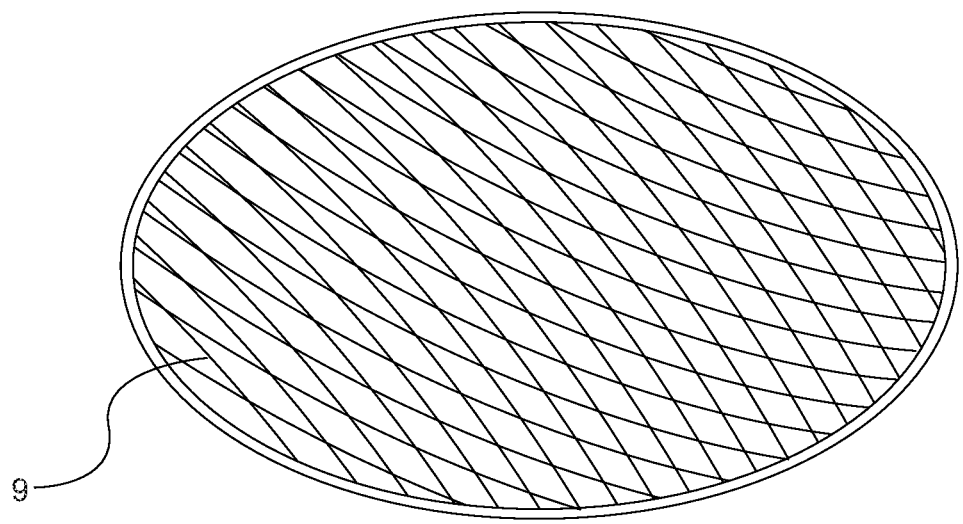
FIG. 4. shows the screen that is attached to the underside of the lid.

FIG. 4 show the screen which is attached to the bottom side of the domed lid 1.

Figure 5:
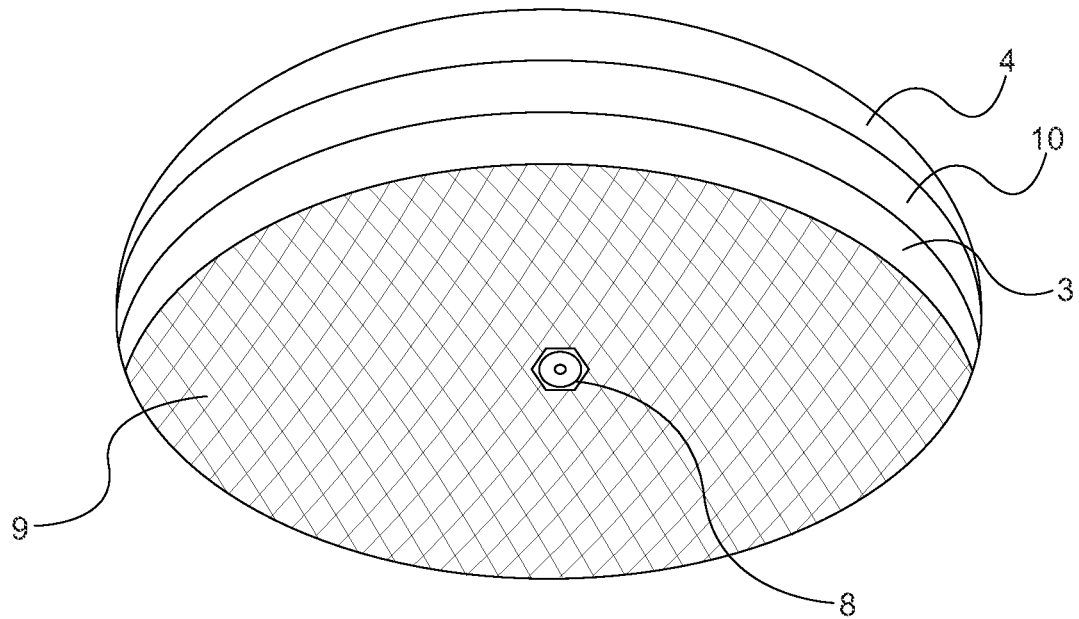
FIG. 5 shows the underside of the venting device without the lid, on the bottom is a screen, and underside of the screen is a nut holing a bolt that is attached to the top of the turntable disc, the stationary device on the top of the stationary disc.

FIG. 5 shows the assembly of the venting components, with the turntable disc 4 on top, the stationary ring 10 underneath the turntable disc 4, the stationary disc 10 sitting on the ring 3, the ring's friction surface 11, the screen that sits below the domed lid 1, and the nut 8 which along with the bolt 6 (not shown) holds the assembly together.

Figure 6:
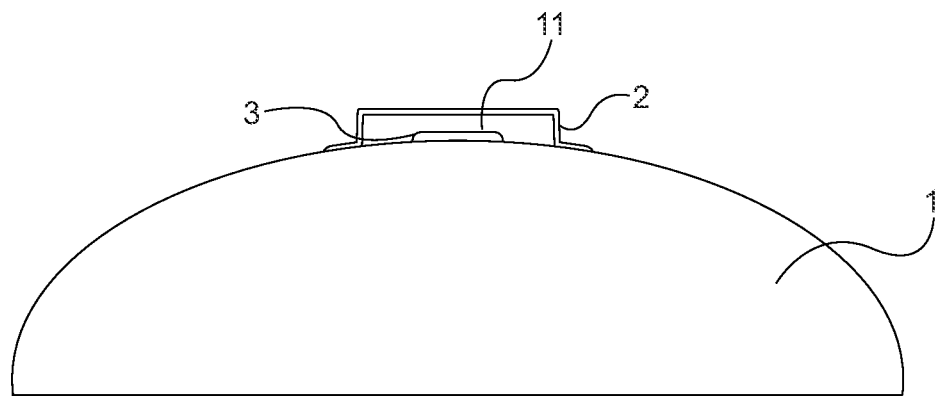
FIG. 6 shows the ring, with a friction top, that sits on the top of the dome lid, and also shows the handle.

FIG. 6 shows a side view if the domed lid 1 without the venting components. The ring 3 sits under the handle 2 with a friction surface 11 on top of the ring 3.

Figure 7:
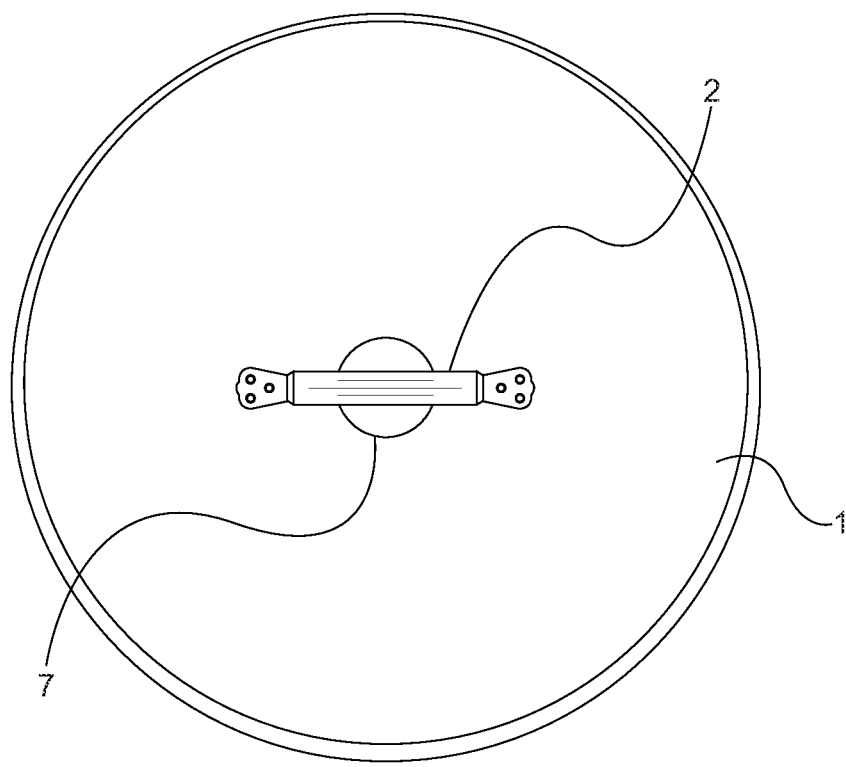
FIG. 7 shows the venting device positioned on the top of the domed lid under the handle.

FIG. 7 shows the domed lid 1 from the top, with the handle 2 in the middle, the opening for vent components 7, the ring 3 and the friction top of the ring 11.

What is claimed is:

1. A lid for a cooking container, comprising:
    a domed cooking lid with a substantial by flat central section having a hole for a variable venting device with a ring around the hole;
    the domed cooking lid with a screen attached to the underside of the lid under the hole for a variable venting device;
    the variable venting device rests on the ring comprises:
    a stationary disc with on half of the stationary disc having venting holes, with the other half being solid;
    a turntable disc with a large opening on one half the disc;
    whereby the turntable disc can be turned over the stationary disc to expose different quantities of the venting to create various levels of venting;
    a nut and a bolt holds the variable device over the screen, the bolt going through the screen and the nut being attached underneath the screen;
    the nut and bolt can be removed to allow the variable venting device to be removed for cleaning;
    both the stationary disc and the turntable discs have a small hole, the small holes are aligned when the turntable disc is turned over the stationary disc in a position that allows minimal venting;
    whereby the variable venting device always allows an amount of venting.

2. The lid as recited in claim 1 which further includes a handle connected to the substantially flat central section.

* * * * *